US006907951B2

(12) United States Patent
Schoenfelder

(10) Patent No.: US 6,907,951 B2
(45) Date of Patent: Jun. 21, 2005

(54) SNOWMOBILE PLANETARY DRIVE SYSTEM

(75) Inventor: Raymond A. Schoenfelder, Zumbrota, MN (US)

(73) Assignee: Arctic Cat, Inc., Thief River Falls, MN (US)

(*) Notice: Subject to any disclaimer, the term of this patent is extended or adjusted under 35 U.S.C. 154(b) by 161 days.

(21) Appl. No.: 09/843,587

(22) Filed: Apr. 26, 2001

(65) Prior Publication Data
US 2001/0032745 A1 Oct. 25, 2001

Related U.S. Application Data

(63) Continuation-in-part of application No. 09/520,101, filed on Mar. 7, 2000, now abandoned.

(51) Int. Cl.[7] .............................................. B62D 21/00
(52) U.S. Cl. ........................ 180/190; 180/9.1; 180/9.64
(58) Field of Search ................................ 180/9.1, 9.21, 180/9.62, 9.64, 190; 475/204, 210

(56) References Cited

U.S. PATENT DOCUMENTS

| 1,370,378 | A | 3/1921 | Starr |
| 2,707,522 | A | 5/1955 | Sibley |
| 3,521,718 | A | 7/1970 | Masaoka et al. |
| 3,529,494 | A | 9/1970 | Gaston |
| 3,698,497 | A | 10/1972 | Bombardier |
| 3,763,978 | A | 10/1973 | Crooks |
| 3,839,921 | A | 10/1974 | Haug |
| 3,884,097 | A | 5/1975 | Arvramidis |
| 3,985,192 | A | 10/1976 | Baxter et al. |
| 4,069,882 | A | 1/1978 | Leonard |
| 4,212,111 | A | 7/1980 | Saari |
| 4,317,389 | A | 3/1982 | Falzoni |
| 4,362,524 | A | 12/1982 | Lob et al. |
| 4,497,218 | A | 2/1985 | Zaunberger |
| 4,502,353 | A | 3/1985 | Beaudoin |
| 4,528,870 | A | 7/1985 | van Deursen et al. |
| 4,546,842 | A | 10/1985 | Yasui |
| 4,718,508 | A | * | 1/1988 | Tervola ..................... 180/6.44 |
| 4,784,018 | A | 11/1988 | Okada et al. |
| 4,893,687 | A | 1/1990 | Simmons |
| 4,974,693 | A | 12/1990 | Nakai et al. |
| 4,988,329 | A | 1/1991 | Lammers |
| 5,004,060 | A | * | 4/1991 | Barbagli et al. ........... 180/6.44 |
| 5,060,745 | A | 10/1991 | Yasui et al. |
| 5,064,011 | A | 11/1991 | Ogano et al. |
| 5,101,919 | A | * | 4/1992 | Ossi ........................... 180/6.2 |

(Continued)

FOREIGN PATENT DOCUMENTS

| CA | 1012467 | 6/1977 |
| CA | 1073012 | 3/1980 |
| DE | 23 31 277 | 1/1975 |
| DE | 41 04 487 A1 | 8/1991 |
| EP | 0 035 806 B1 | 9/1984 |
| EP | 0 208 288 A2 | 1/1987 |
| EP | 0 286 641 B1 | 5/1991 |
| EP | 0553746 | 8/1993 |

OTHER PUBLICATIONS

Harris, R., "Drive Systems Industrial Revolution Black Diamond Moves to Eradicate Chaincases", *ModStock Competition*, vol. 27, No. 6, pp. 18–19, 46 (Fall 2000).

"RMI Drive System", *SnoWest*, vol. 28, No. 3, p. 14 (Mar. 2001).

*Primary Examiner*—Lesley D. Morris
*Assistant Examiner*—L. Lum
(74) *Attorney, Agent, or Firm*—Merchant & Gould P.C.

(57) ABSTRACT

Disclosed is a snowmobile including reduction drive including a planetary gear system having a shaft with a sun gear, a plurality of planetary gears spaced around the sun gear and engaging a ring gear. A second shaft is driven by said planetary gears or ring gear.

39 Claims, 15 Drawing Sheets

U.S. PATENT DOCUMENTS

| | | | |
|---|---|---|---|
| 5,152,725 A | 10/1992 | Shank | |
| 5,172,786 A | 12/1992 | Ishibashi et al. | |
| 5,332,058 A | 7/1994 | Bianco | |
| 5,390,347 A | 2/1995 | Buri et al. | |
| 5,435,793 A | 7/1995 | Varela et al. | |
| 5,467,597 A | 11/1995 | Forster | |
| 5,584,161 A | 12/1996 | Zanini et al. | |
| 5,605,518 A | 2/1997 | Kogure | |
| 5,607,026 A | 3/1997 | Rioux et al. | |
| 5,624,340 A | 4/1997 | Forster | |
| 5,680,715 A | * 10/1997 | Thiboutot et al. | 37/219 |
| 5,685,387 A | 11/1997 | Rioux et al. | |
| 5,803,858 A | 9/1998 | Haka | |
| 5,833,566 A | * 11/1998 | Showalter | 475/198 |
| 5,836,843 A | 11/1998 | Richards | |
| 5,916,053 A | 6/1999 | McCarrick et al. | |
| 5,924,503 A | * 7/1999 | Lykken | 180/6.7 |
| 5,928,099 A | 7/1999 | Tsunemi | |
| 5,951,434 A | 9/1999 | Richards | |
| 5,954,612 A | * 9/1999 | Baxter, Jr. | 475/198 |
| 5,980,414 A | * 11/1999 | Larkin | 475/211 |
| 5,984,821 A | * 11/1999 | Showalter | 475/204 |
| 5,992,552 A | * 11/1999 | Eto | 180/190 |
| 6,070,683 A | 6/2000 | Izumi et al. | |
| 6,086,504 A | * 7/2000 | Illerhaus | 475/347 |
| 6,227,323 B1 | 5/2001 | Ashida | |

FOREIGN PATENT DOCUMENTS

| | | |
|---|---|---|
| EP | 0 807 030 B1 | 3/1999 |
| FR | 2599699 | 12/1987 |
| GB | 1 476 248 | 6/1977 |
| GB | 1 558 726 | 1/1980 |
| GB | 2 045 368 A | 10/1980 |
| GB | 2 051 265 A | 1/1981 |
| GB | 2 062 558 A | 5/1981 |
| GB | 2 156 475 A | 10/1985 |
| JP | 49-108470 | 10/1974 |
| JP | 51-106919 | 9/1976 |
| JP | 52-9229 | 1/1977 |
| JP | 56-42551 | 4/1981 |
| JP | 57-204362 | 12/1982 |
| JP | 60-249757 | 12/1985 |
| JP | 61-084454 | 4/1986 |
| JP | 61-132419 | 6/1986 |
| JP | 61-188283 | 8/1986 |
| JP | 61-192983 | 12/1986 |
| JP | 61-274158 | 12/1986 |
| JP | 63-143482 | 9/1988 |
| JP | 63-297177 | 12/1988 |
| JP | 64-28387 | 2/1989 |
| JP | 1-122785 | 5/1989 |
| JP | 1-98084 | 6/1989 |
| JP | 2-296590 | 12/1990 |
| JP | 3-85750 | 8/1991 |
| JP | 5-20918 | 3/1993 |
| JP | 6-117500 | 4/1994 |
| JP | 7-101364 | 4/1995 |
| JP | 8-324323 | 12/1996 |
| JP | 9-240525 | 9/1997 |
| JP | 10-81152 | 3/1998 |
| JP | 10-194169 | 7/1998 |
| JP | 10-203436 | 8/1998 |
| JP | 10-316008 | 12/1998 |
| JP | 10-316057 | 12/1998 |
| WO | 86 07423 | 12/1986 |

* cited by examiner

SNOWMOBILE PLANETARY DRIVE SYSTEM

CROSS REFERENCE TO RELATED APPLICATIONS

This application is a continuation in part of U.S. patent application Ser. No. 09/520,101 that was filed with the United States Patent and Trademark Office on Mar. 7, 2000 now abandoned. The entire disclosure of U.S. patent application Ser. No. 09/520,101 is incorporated herein by reference.

FIELD OF THE INVENTION

The present invention relates to snowmobiles and more particularly to drive systems for snowmobiles. More particularly, the present invention relates to a drive system for a snowmobile utilizing a planetary gear system.

BACKGROUND OF THE INVENTION

Snowmobiles have been known for many years. Early snowmobiles were developed with an appearance that is very primitive compared to the snowmobile of today. The snowmobile of modern times is a sophisticated vehicle with heated handle bars, twin head lights, a reversible transmission and many other improvements not found in the original snowmobiles. One of the developments of recent times has been the very high powered engines. Today the engines found in snowmobiles may rival the engines in high powered race cars of a few years ago. Snowmobile engines of three hundred horse power are not uncommon.

One of the weak points in snowmobiles has been the drive system. Snowmobile drive systems have generally included a chain rpm reduction drive. The rpm of the engine must be reduced prior to applying the rotational drive to the differential sprockets driving the track. In the past the drive system has included a chain and sprocket system. The chain and sprocket system tends to wear and is subject to extreme abuse in the activities of normal snowmobile use. The rapid starts and stops, the very high rpm torque when the snowmobile leaves the ground and leaps into the air results in extremely rapid changes of speed and load. The chain will typically last three or four hundred hours.

There have been longstanding needs for a snowmobile drive system that is durable, lightweight, minimal number of parts, minimal number of moving parts, compact and of reduced shaft wind-up. Each of these longstanding needs is explained further below.

There has been a longstanding need for a drive system that is more durable than the chain and sprocket system. The present invention replaces the chain and sprocket system that has been the standard in the past snowmobiles with a system that withstands torques far in excess of those encountered in snowmobiles in the past. The present invention provides a drive system that will last for up to fifteen hundred hours of rugged operation. When replacement becomes necessary the drive system of the present invention is easily replaced.

There has also been a longstanding need to reduce the weight of snowmobiles. A lower weight snowmobile has the ability to accelerate more quickly and is much easier to maneuver. The prior art chain and sprocket drive trains require the use of three axes. Specifically, the prior art chain and sprocket drive trains include the engine drive shaft, a continuously variable transmission extending from the engine drive shaft to a second shaft and a chain and sprocket gear reduction from the second shaft to a third shaft. The third shaft includes sprockets for driving the continuous track that drives the snowmobile forward in the snow. Each shaft and corresponding parts such as support brackets and bearings add weight to the drive train. It is highly desirable to reduce the number of parts to reduce the weight of the snowmobile.

There has additionally been a longstanding need to reduce the number of moving parts. Moving parts tend to wear out and require time and money for repair and replacement.

Moving parts such as a rotating shaft also lower the energy efficiency of a drive train.

There has additionally been a longstanding need to design a drive train that is more compact so as to take up less space within the snowmobile.

There has additionally been a longstanding need for a drive train that reduces shaft wind-up (lag in torque across length of a member) by eliminating the additional shaft necessitated by the use of a chain and sprocket reduction drive.

SUMMARY OF THE INVENTION

The present invention provides a snowmobile having a drive train including a planetary gear system. The planetary gear system has a sun gear that is mounted on a shaft driven by the snowmobile engine. The sun gear engages with a plurality of planetary gears arranged around the sun gear. Planetary gears in turn engage a ring gear resulting in rotation of the track shaft that drives the drive track that drives the snowmobile forward in the snow. The relative sizes of the sun gear, planetary gears and the ring gear affect the rpm reduction ratio between the engine drive shaft and the track shaft.

DETAILED DESCRIPTION OF THE PREFERRED EMBODIMENT

Figure 1:
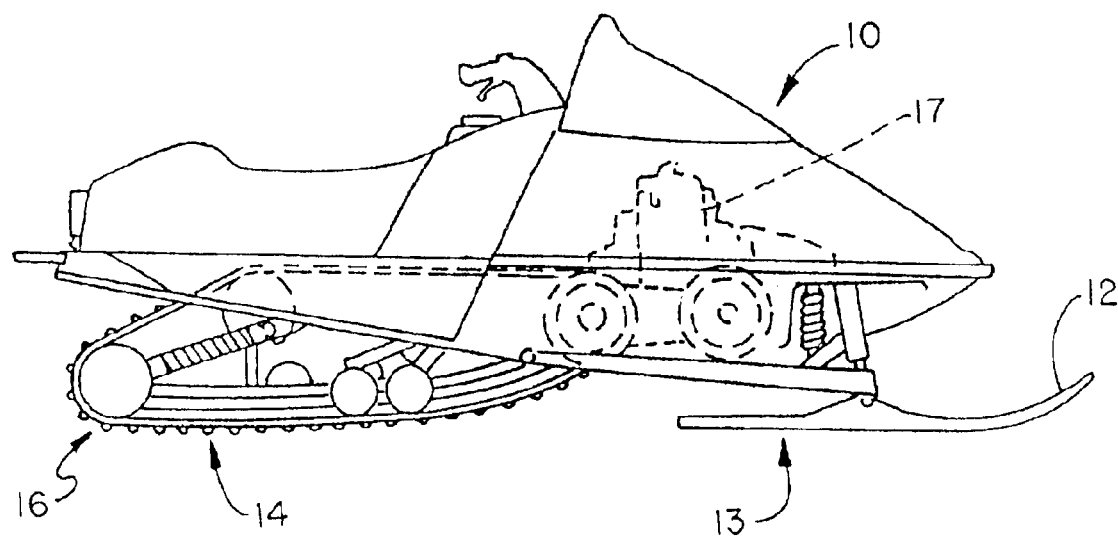
FIG. 1 shows a snowmobile of the present invention.
Figure 2:
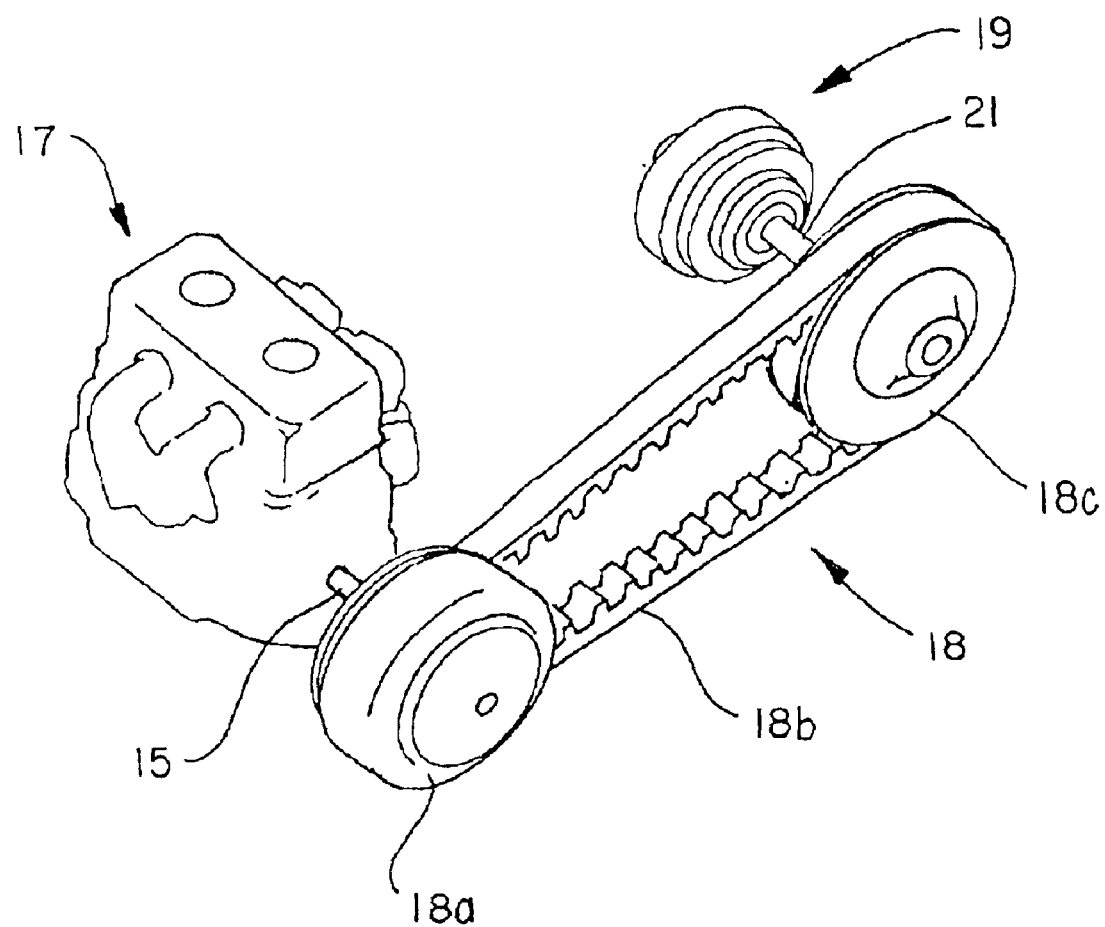
FIG. 2 shows a perspective view of the snowmobile engine and drive system of the present invention.
Figure 3:
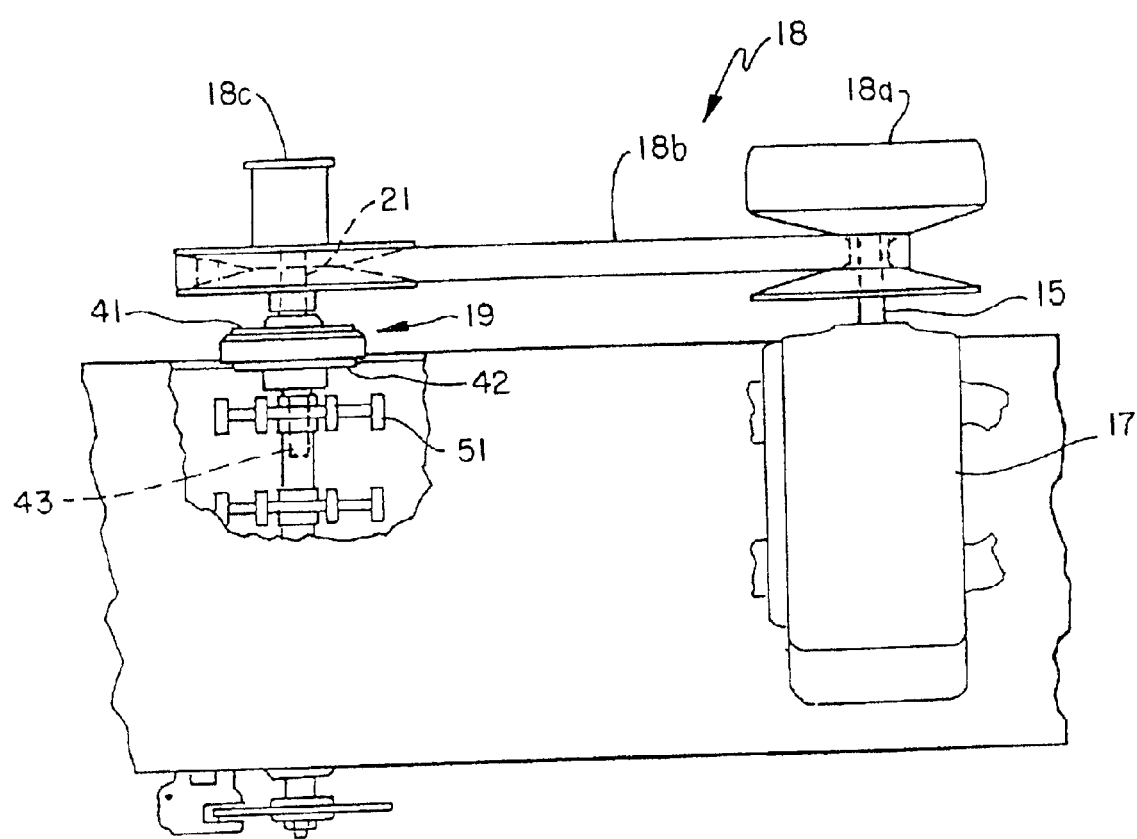
FIG. 3 shows a plan view of a chassis including an engine, clutch system and the planetary drive system of the present invention.
Figure 4:
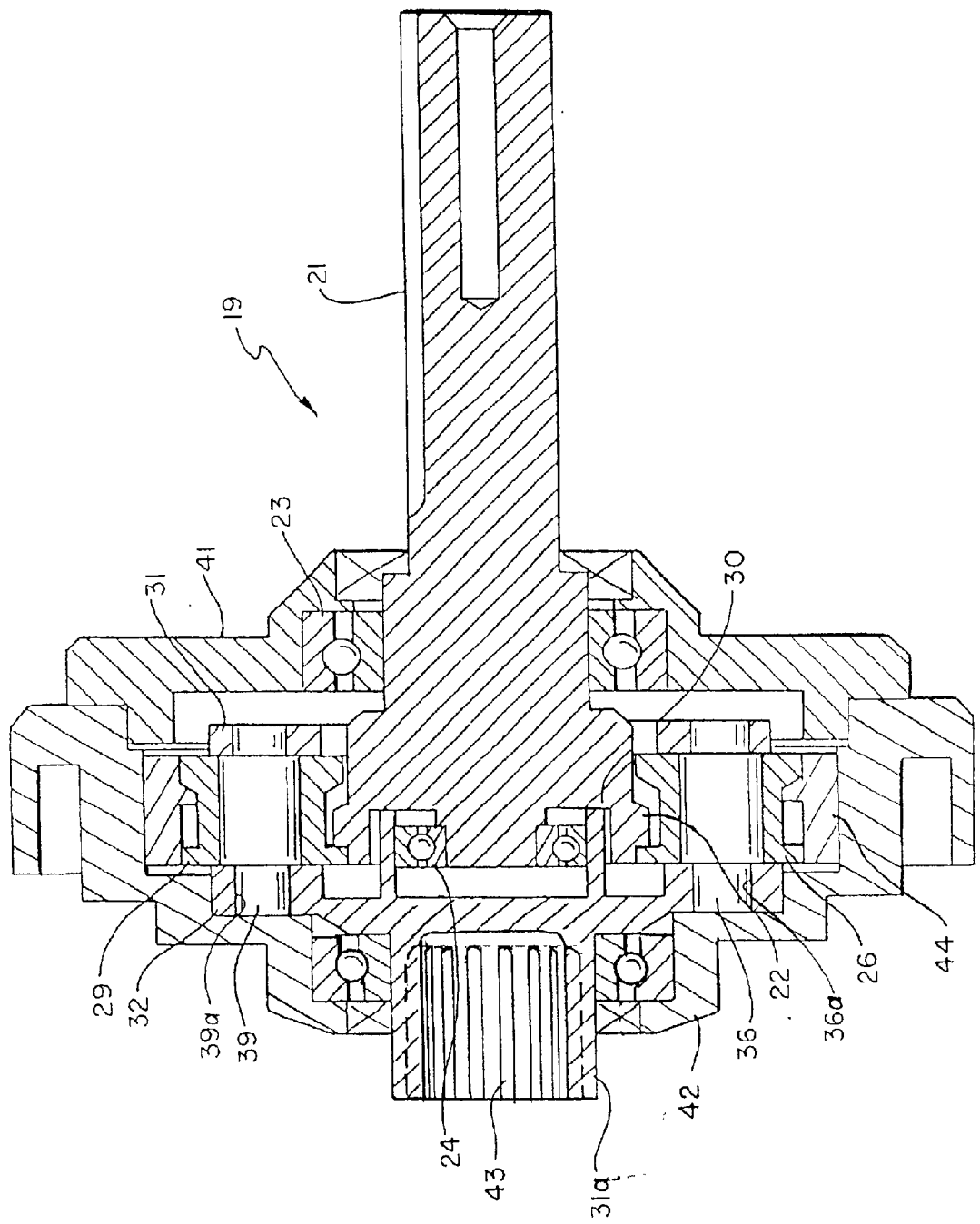
FIG. 4 shows a sectional view of the planetary drive system of the present invention.
Figure 5:
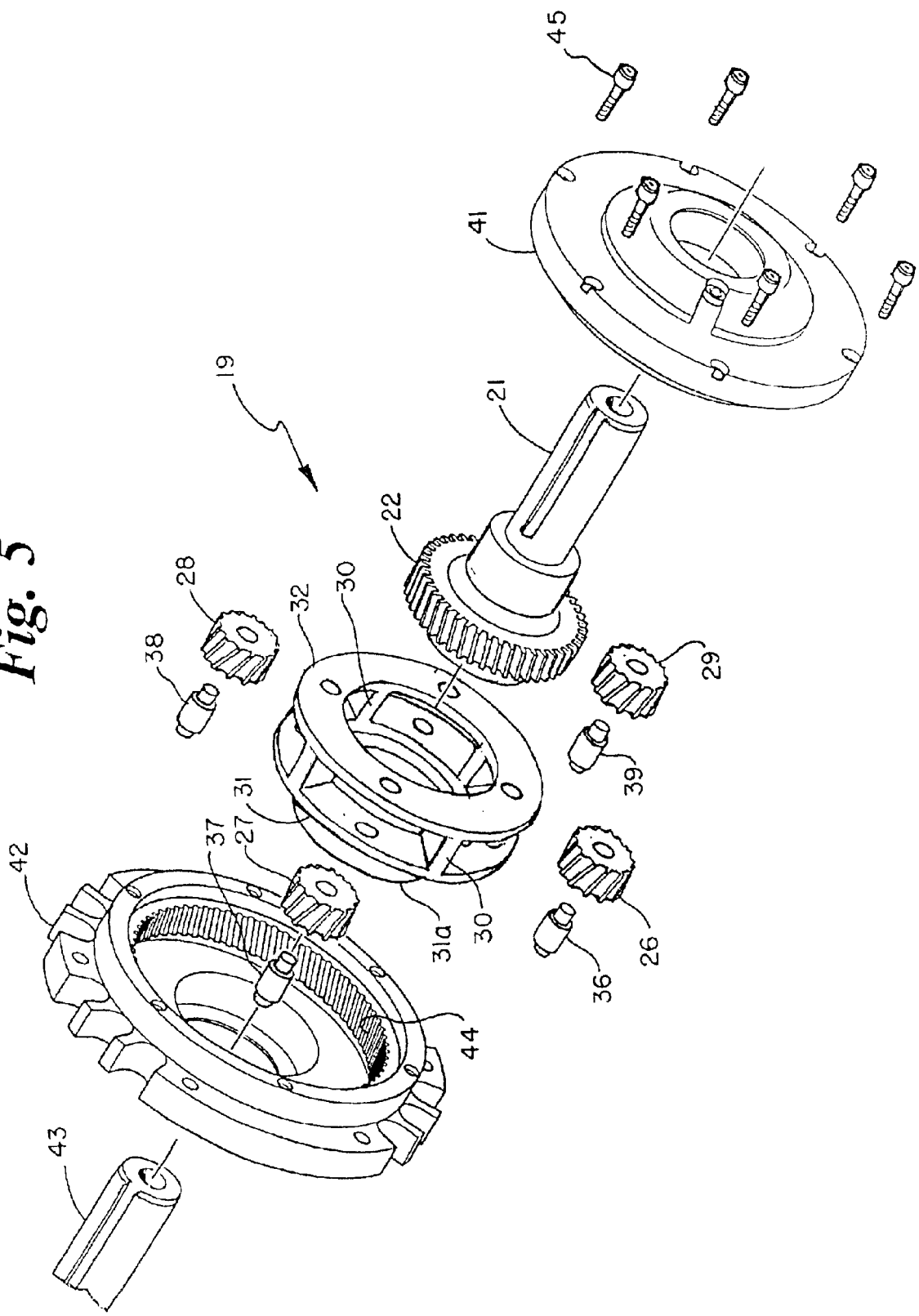
FIG. 5 shows an exploded view of the planetary drive system of the present invention.
Figure 6:
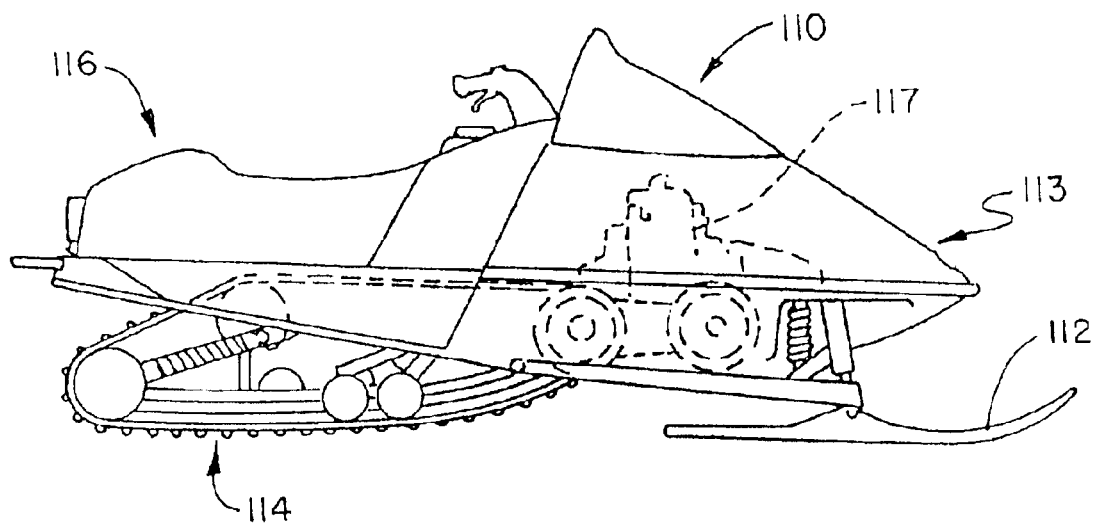
FIG. 6 shows an alternative embodiment of the present snowmobile.
Figure 7:
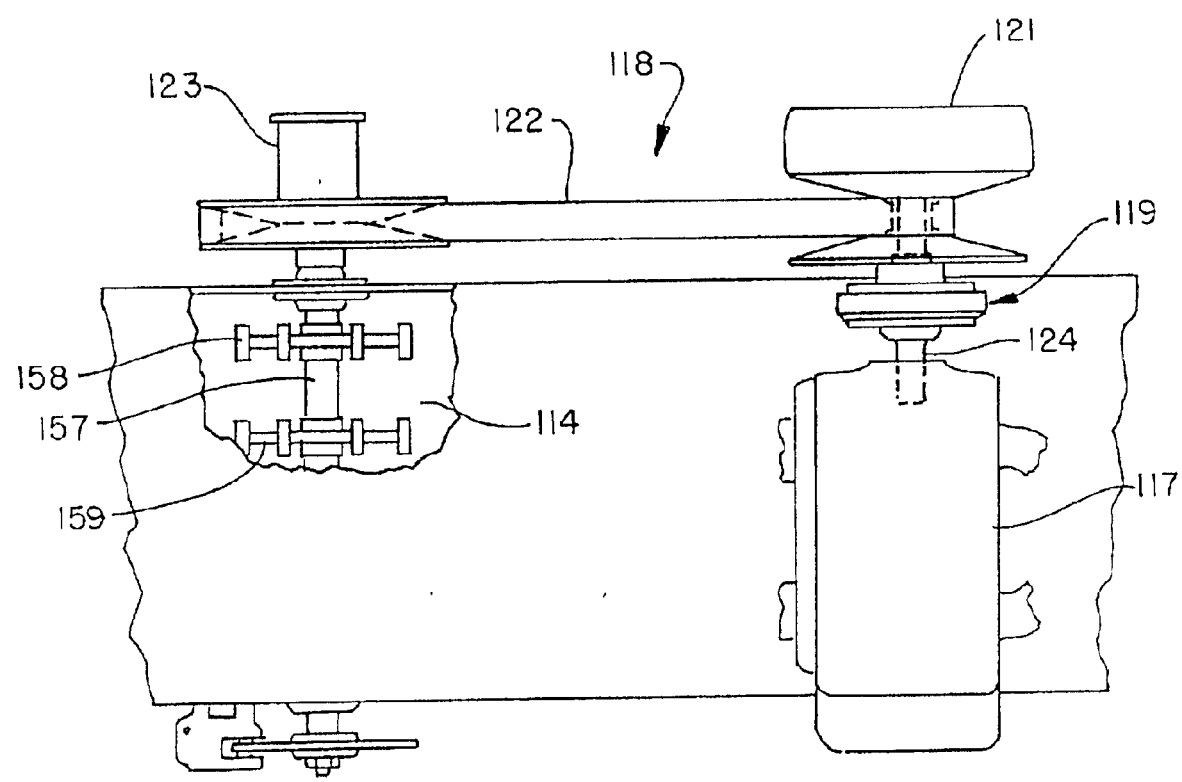
FIG. 7 shows a plan view of a chassis of an alternative embodiment of the present invention including an engine and the reduced rpm clutch system.
Figure 8:
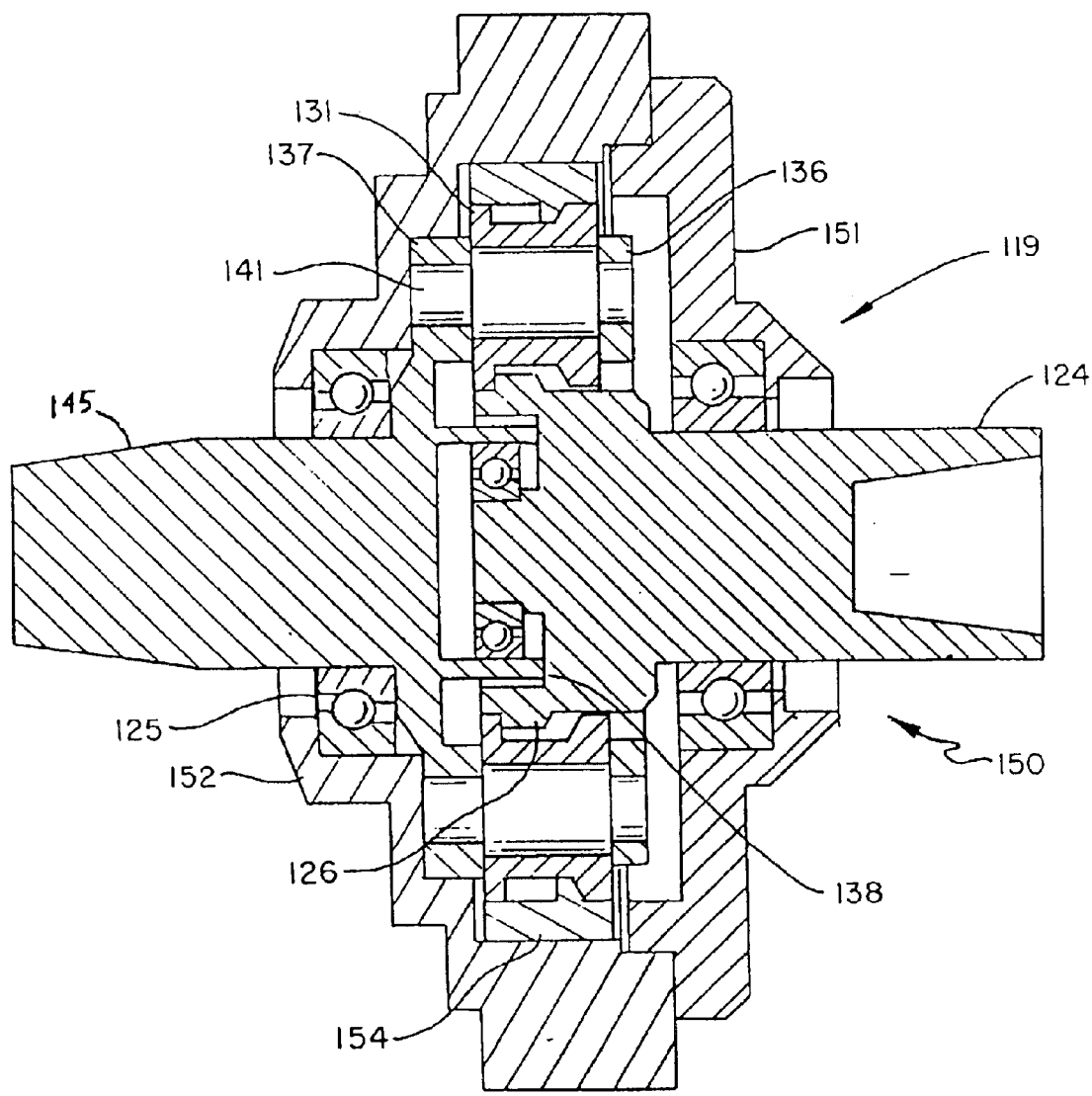
FIG. 8 shows a sectional view of the planetary gear reduction system of an alternative embodiment of the present invention.

FIGS. 1–8 are the original figures from the parent application Ser. No. 09/520,101 that was filed with the United States Patent and Trademark Office on Mar. 7, 2000. Some changes have been made to FIGS. 1–8 for clarification purposes. The snowmobile 10 of the present invention (FIG. 1-5) includes a pair of skis 12, which support the forward portion 13 of the snowmobile 10. A continuous track 14 supports the rear portion 16 of the snowmobile 10. The snowmobile 10 has an engine 17 which is disposed in the forward portion 13.

The engine 17 rotatably drives a train 18 which in turns drives the endless track 14. The drive train 18 includes an engine drive shaft 15, primary clutch 18a, a drive belt 18b, a secondary clutch 18c and a reduction drive 19. The reduction drive 19 may include a drive shaft 21 that is rotatably driven by the secondary clutch 18c. The drive shaft 21 (FIGS. 4 & 5) carries a sun gear 22, which is integral with said shaft 21. The shaft 21 is rotatably supported in suitable bearings such as roller bearings 23 and 24.

The reduction drive 19 further includes a plurality of planetary gears 26, 27, 28, and 29. The reduction drive 19 is shown having four planetary gears 26–29, however, the reduction drive may have any desired number of such gears, e.g., three. The planetary gears 26–29 are supported between a pair of planetary gear plates 31, 32. The plates 31, 32 carry a plurality of shafts 36, 37, 38 and 39 which rotatably support the gears 26–29 respectively. The shafts 36–39 may be integrally secured to the plates 31, 32, which in turn serve to maintain said gears 26–29 in spaced relationship around the sun gear. Spacers 30 may retain plates 31, 32 in proper spaced relationship. The shafts 36–39 are secured in the openings 36a–39a, respectively.

The reduction drive 19 includes a second shaft 43 which is integral with the plates 31, 32. In other words shaft 43 is locked by a key in the hub 31a.

The reduction drive 19 has a housing 40 including first housing member 41 and a second housing member 42. A ring gear 44 is integrally mounted in the second housing member 41. The ring gear 44 engages the planetary gears 26–29. The second shaft 43 is integral, e.g., in locked driving engagement, with the plates 31, 32 and is driven by planetary gears 26–29. The second shaft 43 serves to drive the endless track 14 through sprocket 51.

The sun gear 22, planetary gears 26–29 and ring gear 44 are contained in housing 40 including first housing member 41 and second housing member 42. The housing members 41 and 42 may be held together by suitable screws 45.

The operation of the present invention is apparent from the description of the snowmobile 10, however in order to provide a more complete understanding of the present invention the operation will be further described. The engine 17 may be a conventional gasoline powered engine of the type generally found in snowmobiles. However, the engine 17 may be any other type of engine suitable for driving a snowmobile. The engine 17 rotatably drives the primary clutch 18a which in turn drives the belt 18b. The drive belt 18b may drive the secondary clutch 18c which rotatably drives the shaft 21. The sun gear 22 is then driven by the shaft 21. The sun gear 22 engages the planetary gears 26–29 which are rotatably supported in the plates 31, 32. The force of the sun gear 22 acting on the planetary gears 26–29 cause the gears 26–29 to rotate and move along the ring gear 44 thereby rotating the plates 31, 32. The rotation of plates 31, 32 rotatably drives the second shaft 43. The second shaft 43 rotates at an rpm lower than the rotation of the first shaft 21 resulting in a gear reduction. The second shaft 43 in turn drives a sprocket 51 acting on the endless track 14, thereby driving such track.

An Alternative Embodiment of the Present Invention:

A further embodiment of the present invention snowmobile 110 (FIG. 6-8) includes a pair of skis 112 which support the forward portion 113 of the snowmobile 110. A continuous track 114 supports the rear portion 116 of the snowmobile 110. The snowmobile 110 has an engine 117 which is disposed in the forward portion 113.

The engine 117 rotatably drives a power train 118 which in turns drives the endless track 114. The drive train 118 includes a planetary reduction gear system 119, which in turn drives a primary clutch 121, a drive belt 122, and a secondary clutch 123. The planetary reduction drive system 119 may be mounted on the drive shaft 124 of the engine 117. The planetary reduction drive system 119 may be similar in structure to planetary reduction drive system 19 shown in FIGS. 4 and 5. The planetary reduction drive system 119 is rotatably driven by the engine drive shaft 124. The engine drive shaft 124 (FIGS. 7 & 8) drives a drive shaft 127 (also may be referred to as an input shaft) that carries a sun gear 126 that is integral with the engine drive shaft 124. The engine drive shaft 124 may be rotatably supported in suitable bearings such as roller bearings 125.

The reduction drive system 119 further includes a plurality of planetary gears 131. The planetary gears 131 are supported between a pair of planetary gear plates 136, 137. The plates 136, 137 carry a plurality of shafts 141 which rotatably support the gears 131 respectively. The shafts 141 may be integrally secured to the plates 136, 137, which in turn serve to maintain said gears 131–134 in spaced relationship around the sun gear 126. A plurality of spacers 138 may retain plates 136, 137 in proper spaced relationship such that the planetary gears 131 may freely rotate there between. The spacers 138 may be integral with respect to plates 136, 137.

The reduction drive 119 includes a second shaft 145 which is integral with respect to the plates 136, 137. Second shaft 145 is tapered to fit the primary clutch 121. Of course any shape second shaft that is capable of driving the primary clutch is within the scope of the present invention.

The reduction drive 119 has a first housing member 151 and a second housing member 152. A ring gear 154 is integrally mounted in the second housing member 152. The ring gear 154 engages the planetary gears 131. The second shaft 145 is integral, e.g., in locked driving engagement, with the plates 136, 137 and is driven by planetary gears 131. The second shaft 145 serves to drive the primary clutch 121.

The sun gear 126, planetary gears 131 and ring gear 154 are contained in housing 150 including first housing member 151 and second housing member 152. The housing members 151 and 152 may be held together by suitable screws (not shown).

The operation of the present invention including the reduced rpm clutch is apparent from the description of the snowmobile 110. The engine 117 may be a conventional gasoline powered engine. The engine 117 has an engine drive shaft 124, which drives a sun gear 126, which in turn drives a plurality of planetary gears 131. The sun gear 126 engages the planetary gears 131 which are rotatably supported in the plates 136, 137. The force of the sun gear 126 acting on the planetary gears 131 cause the gears 131 to rotate and move along the ring gear 154 thereby rotating the plates 136, 137. The rotation of plates 136, 137 rotatably drives the second shaft 145. The second shaft 145 rotates at an rpm lower than the rotation of the drive shaft 124 resulting in a gear reduction. The second shaft 145 rotatably drives the primary clutch 121 which in turn drives the belt 122. The drive belt 122 drives the secondary clutch 123. Clutch 123 rotatably drives the shaft 157 which carries sprocket drives 158 and 159. The sprockets 158, 159 drive the track 114.

Figure 9:
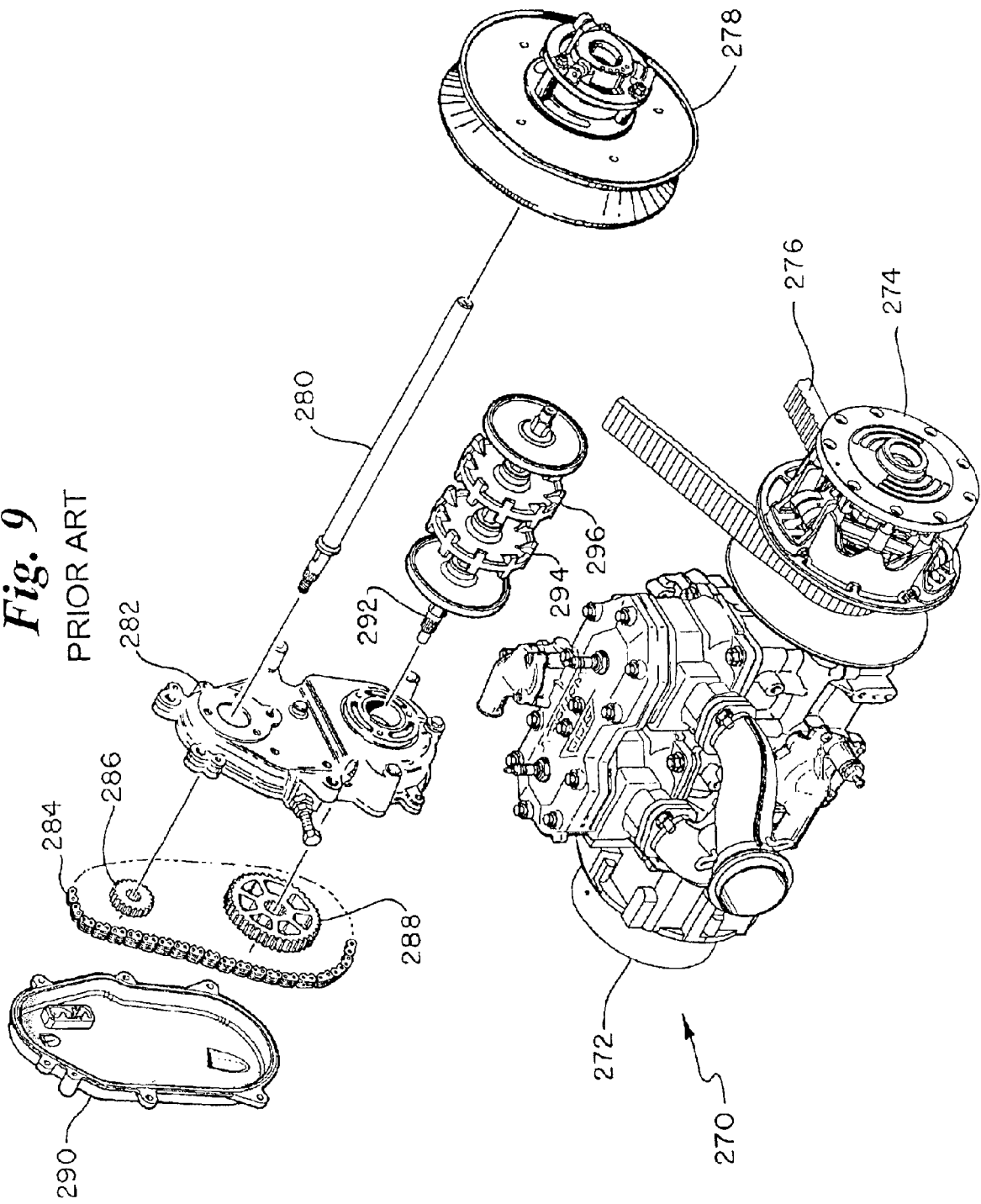
FIG. 9 shows an exploded perspective view of a prior art drive train.
Figure 10:
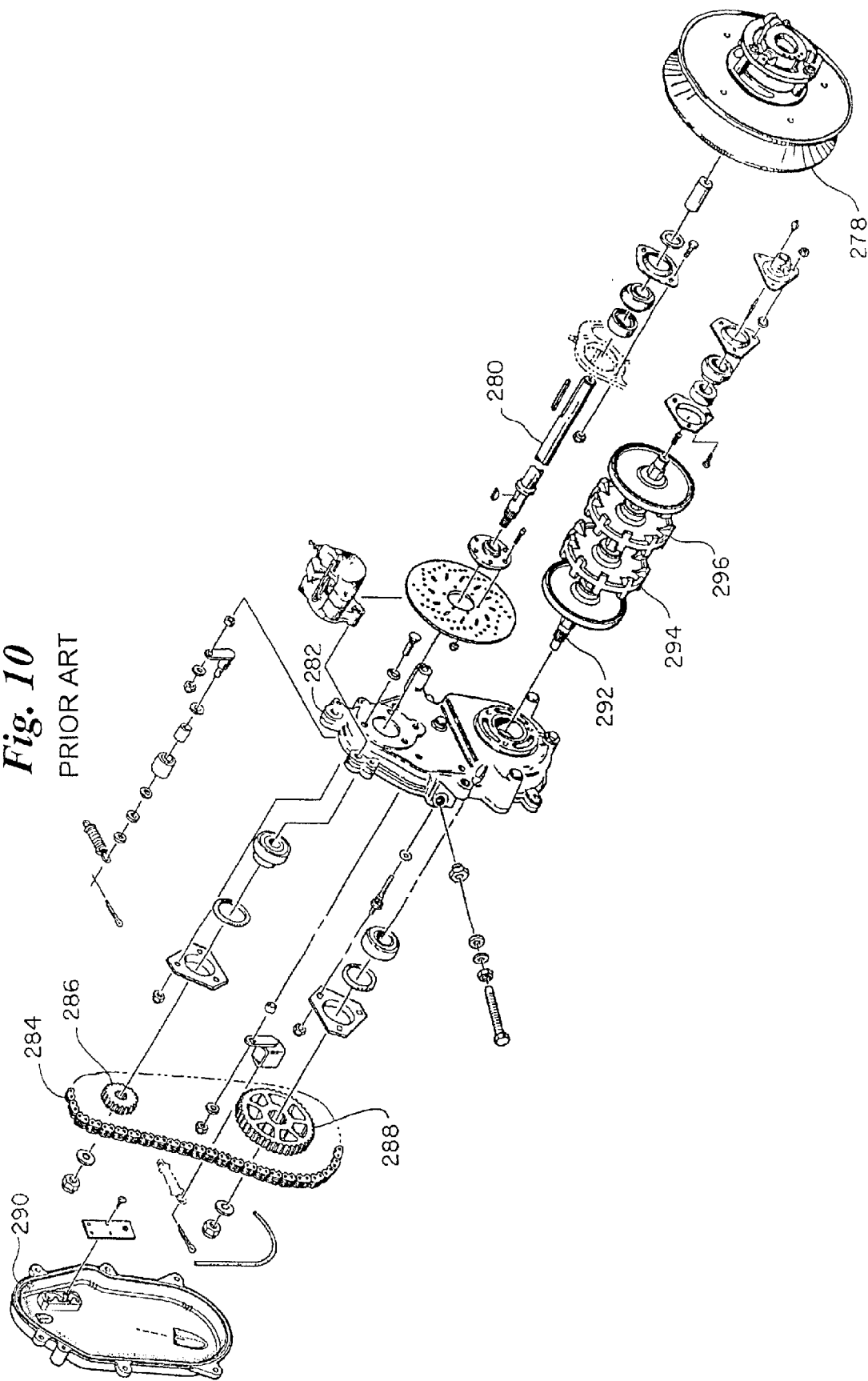
FIG. 10 shows an exploded perspective view of a portion of the prior art drive train.
Figure 11:
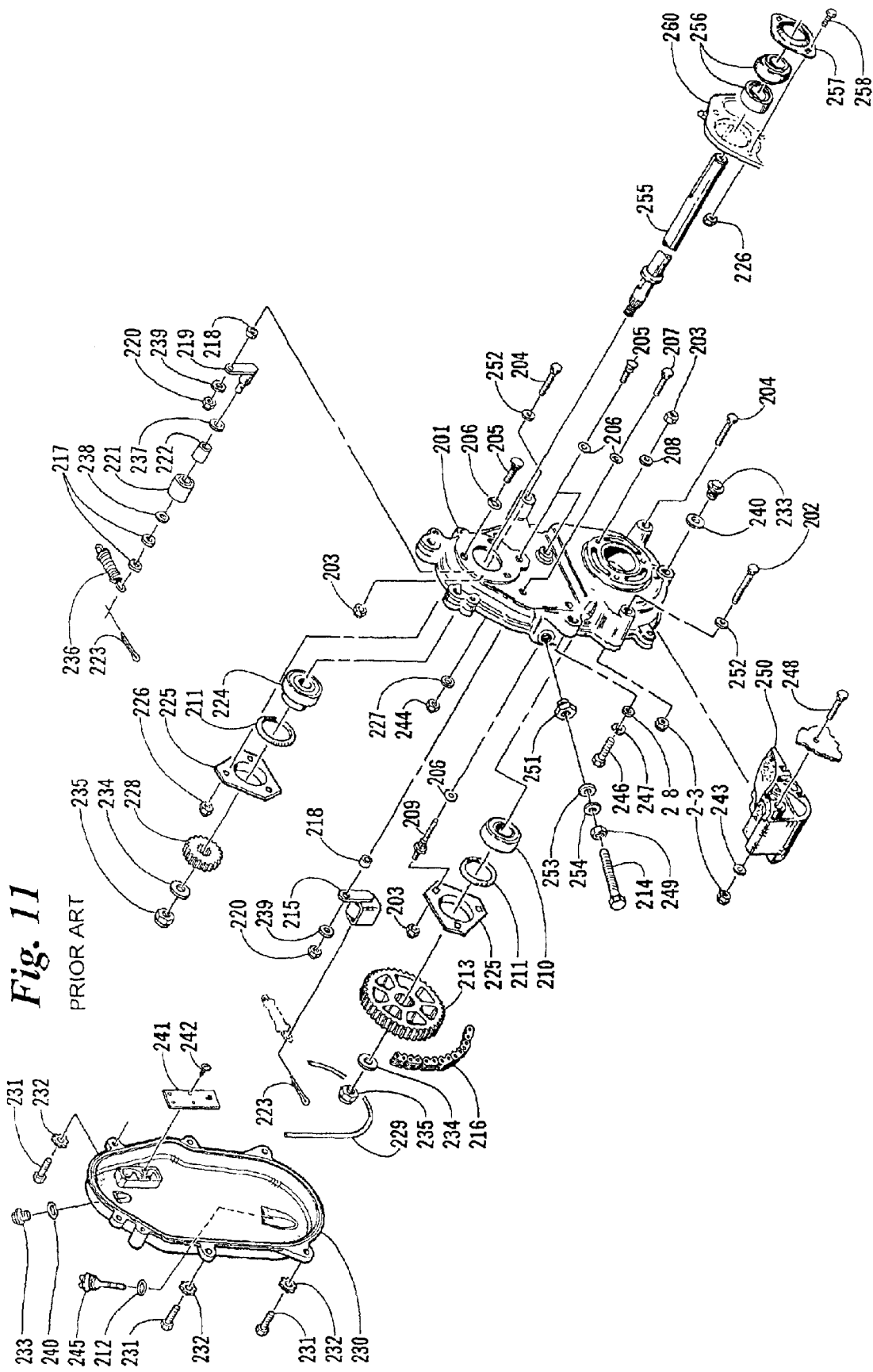
FIG. 11 shows an exploded perspective view of the parts of a prior art drive train that are eliminated by one embodiment of the present invention.

Turning now to FIGS. 9–11, a conventional prior art snowmobile drive system is shown. FIG. 9 is an exploded perspective view of the major components of a prior art drive system including the engine. FIG. 10 is an exploded perspective view of the portion of a prior art drive system from the secondary clutch to the track drive sprockets. FIG. 11 is an exploded perspective view of the parts of the conventional prior art drive system of FIG. 10 that may be eliminated by one embodiment of the present invention.

The major components of the prior art drive system 270 shown in FIG. 9 are engine 272, primary clutch 274, engine drive shaft (not shown) connecting the engine 272 to the primary clutch 274, drive belt 276 (shown in partial cutaway view), secondary clutch 278, driven shaft 280, dropcase 282, drive chain 284, top drive sprocket 286, bottom drive sprocket 288, dropcase cover 290, shaft 292 and track drive sprockets 294 and 296.

FIG. 10 includes the major components from the secondary clutch 278 to the track drive sprockets 294 and 296 as well as additional components of the conventional prior art drive train system 270.

The parts of a chain and sprocket rpm reduction drive of the prior art are subject to wear and tear and tend to require high maintenance. Furthermore, the use of a chain and sprocket reduction drive requires that the drive system, including the engine drive shaft, have three parallel shafts. For each shaft there must be associated bearings and other support parts associated therewith. The present invention advantageously eliminates one of the three shafts, in addition to the elimination of the chain and sprocket rpm reduction drive.

Transmission of power through a rotating shaft results in shaft wind-up. Shaft wind-up is essentially a lag in the power transmission through the shaft. The amount of wind-up is dependent on the shaft material as well as the shaft length. This lag in power transmission introduces inefficiencies and power loss into the drive train. Therefore, the elimination of the third shaft by use of a planetary reduction drive provides a further significant advantage of reducing total wind-up in the system.

The elimination of the third shaft, along with elimination of many associated parts, results in a significant weight reduction in the drive train. FIG. 11 is an exploded perspective view of the parts of the conventional prior art drive system of FIG. 10 that may be eliminated by one embodiment of the present invention, specifically the embodiment shown in FIG. 13. The reference numbers shown in FIG. 11 are listed in the below table, with associated part numbers, quantity that can be eliminated by the FIG. 13 embodiment of the present invention, part description and weight in pounds.

| REF # in FIG. 11 | PART NO. | QTY | DESCRIPTION | WEIGHT |
|---|---|---|---|---|
| 201 | 0702-375 | 1 | DROPCASE W/STUDS | 3.974 |
| 202 | 8011-143 | 1 | BOLT, CARRIAGE | 0.038 |
| 203 | 8040-426 | 10 | NUT, LOCK | 0.112 |
| 204 | 8011-139 | 2 | BOLT, CARRIAGE | 0.110 |
| 205 | 0123-523 | 4 | BOLT, RIBBED | 0.011 |
| 206 | 0607-025 | 9 | O-RING STUD | 0.010 |
| 207 | 0623-117 | 2 | BOLT, RIBBED | 0.069 |
| 208 | 8050-247 | 6 | WASHER | 0.012 |
| 209 | 0623-317 | 3 | STUD | 0.138 |
| 210 | 1602-051 | 1 | BEARING, 1 IN | .320 |
| 211 | 1670-237 | 2 | SEAL, O-RING | 0.004 |
| 212 | 0670-183 | 1 | O-RING, OIL LEVEL STICK | 0.001 |
| 213 | 1602-087 | 1 | SPROCKET 39T | 2.036 |
| 214 | 1602-101 | 1 | ADJUSTER, CHAIN | 0.068 |
| 215 | 0702-324 | 1 | ARM, TIGHTENER-ASSY | 0.496 |
| 216 | 1602-041 | 1 | CHAIN, 70P | 1.635 |
| 217 | 8050-212 | 2 | WASHER | 0.002 |
| 218 | 0602-369 | 2 | BUSHING, TIGHTENER ARM | 0.004 |
| 219 | 0702-115 | 1 | ARM, TIGHTENER | .310 |
| 220 | 0623-122 | 2 | NUT, LOCK | 0.021 |
| 221 | 0702-129 | 1 | ROLLER, TIGHTENER (INC. 22) | .398 |
| 222 | 0602-383 | 1 | BEARING, CHAIN TIGHTENER | .215 |
| 223 | 0123-082 | 2 | PIN, COTTER | — |
| 224 | 1602-052 | 1 | BEARING, ⅞ IN | 0.332 |
| 225 | 0602-198 | 2 | PLATE, FLANGE | 0.136 |
| 226 | 8041-426 |  | NUT, LOCK | 0.021 |
| 227 | 0623-094 | 2 | WASHER | 0.002 |
| 228 | 0602-456 | 1 | SPROCKET, 20T | 0.452 |
| 229 | 0602-437 | 1 | SEAL, DROPCASE | 0.021 |
| 230 | 0602-989 | 1 | COVER, DROPCASE | 1.985 |
| 231 | 8002-134 | 6 | SCREW, CAP | 0.186 |
| 232 | 8053-242 | 6 | WASHER, LOCK-EXTERNAL TOOTH | 0.006 |
| 233 | 0623-293 | 2 | PLUG, DROPCASE | 0.096 |
| 234 | 0623-231 | 2 | WASHER, SPRING | 0.090 |
| 235 | 0623-465 | 2 | NUT, LOCK | 0.082 |
| 236 | 0702-130 | 1 | SPRING ASSEMBLY | .090 |
| 237 | 0623-283 | 1 | WASHER | 0.008 |
| 238 | 0623-284 | 1 | WASHER | 0.008 |
| 239 | 8050-217 | 2 | WASHER | 0.008 |
| 240 | 0123-641 | 2 | WASHER, FIBER | 0.002 |
| 241 | 1602-152 | 1 | COVER, OIL VENT | 0.033 |
| 242 | 0623-081 | 4 | SCREW, SELF-TAPPING | 0.008 |
| 243 | 8050-242 | 1 | WASHER | 0.008 |
| 244 | 8042-426 | 1 | NUT | 0.016 |
| 245 | 0602-462 | 1 | STICK, OIL LEVEL | 0.015 |
| 246 | 8002-135 | 1 | SCREW, CAP | 0.038 |
| 247 | 8051-242 | 1 | WASHER, LOCK | 0.008 |
| 248 | 8011-137 | 1 | BOLT, CARRIAGE | 0.038 |
| 249 | 0123-150 | 1 | NUT | 0.016 |
| 250 | 0616-964 | 1 | GUARD, DROPCASE | .520 |
| 251 | 0602-876 | 1 | ADAPTER, MANUAL ADJUST | .102 |
| 252 | 8050-252 | AR | WASHER | 0.008 |
| 253 | 0623-905 | 1 | SEAL, MANUAL ADJUST | .008 |
| 254 | 8050-272 | 1 | WASHER | 0.008 |
| 255 | 0702-266 | 1 | SHAFT, DRIVEN | 5.589 |
| 256 | 1602-099 | 1 | BEARING, 1 IN (W/LOCK COLLAR) | 0.399 |
| 257 | 0602-892 | 1 | PLATE, FLANGE | 0.136 |
| 258 | 8002-130 | 2 | SCREW, CAP | 0.044 |
|  |  |  | TOTAL | 20.492 LBS. |

While the above table is provided for purposes of demonstrating the advantage of he current invention, it is important to keep in mind that the exact parts utilized in the present invention will vary within the scope of the invention and should not be limited by this table. Use in the present invention, of one or more of the parts listed in this table and shown in FIG. 11 does not bring a device outside the scope of the present invention. The commonality across the various embodiments of the present invention resides in the fact that the present invention eliminates one of the three major parallel shafts that exist in the prior art while still obtaining desired rpm reduction.

Figure 12:
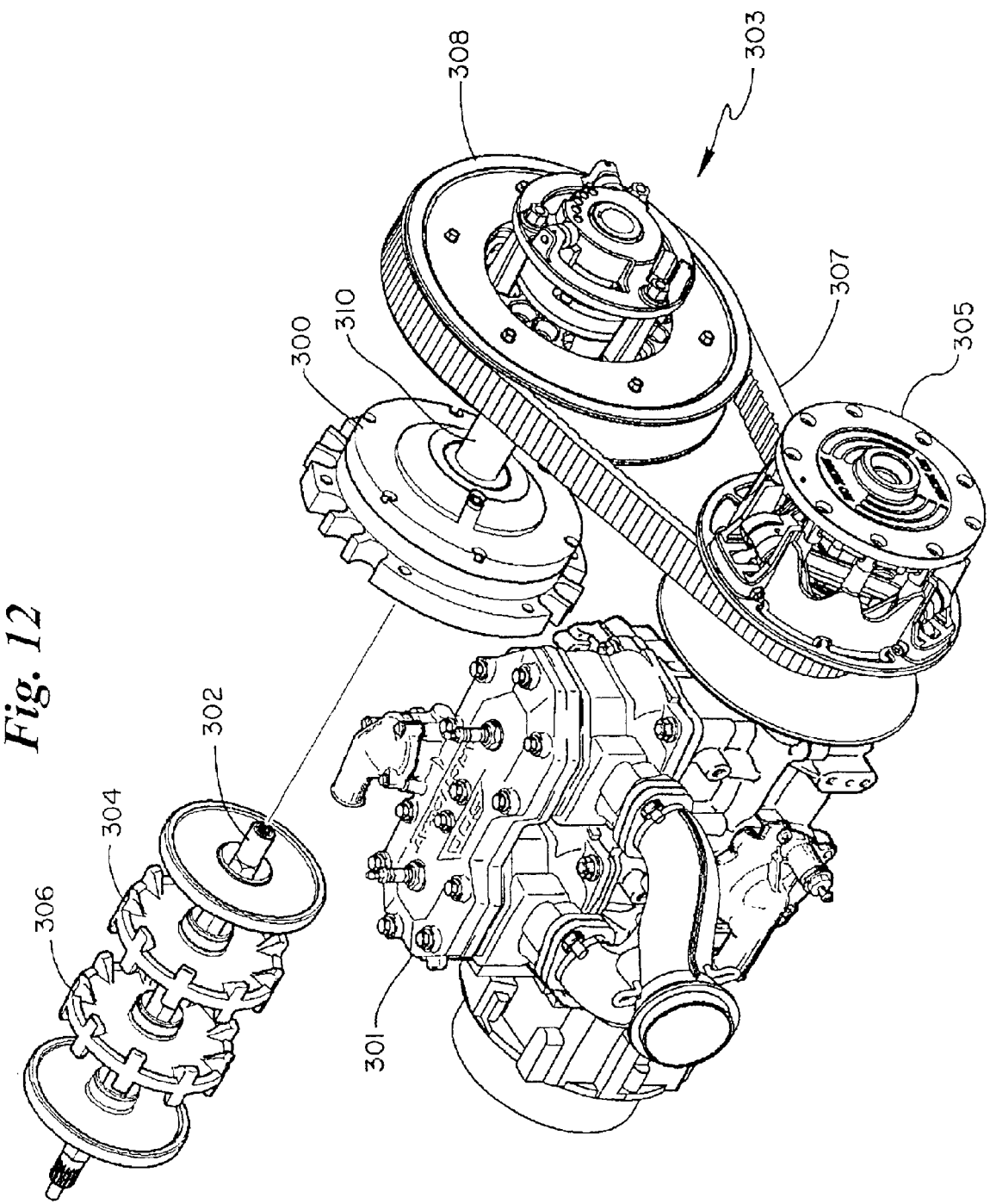
FIG. 12 is a perspective view of a engine and drive train according to an alternative embodiment of the present invention.

Another Alternative Embodiment of the Present Invention:

A further embodiment of a drive train according to the principles of the present invention is shown in FIGS. 12–15. FIG. 12 is a perspective view of an engine 301 and a drive train 303 according to the principles of the present invention. The drive train 303 includes one embodiment of a continuously variable transmission, specifically, a primary clutch 305 that is driven by the engine drive shaft (not shown), a drive belt 307 and a secondary clutch 308 driven by the drive belt 307. The drive train 303 further includes a planetary gear system 300 including drive shaft 310, track shaft 302, sprockets 304 and 306 and secondary clutch 308 arranged along a center axis.

Figure 14:
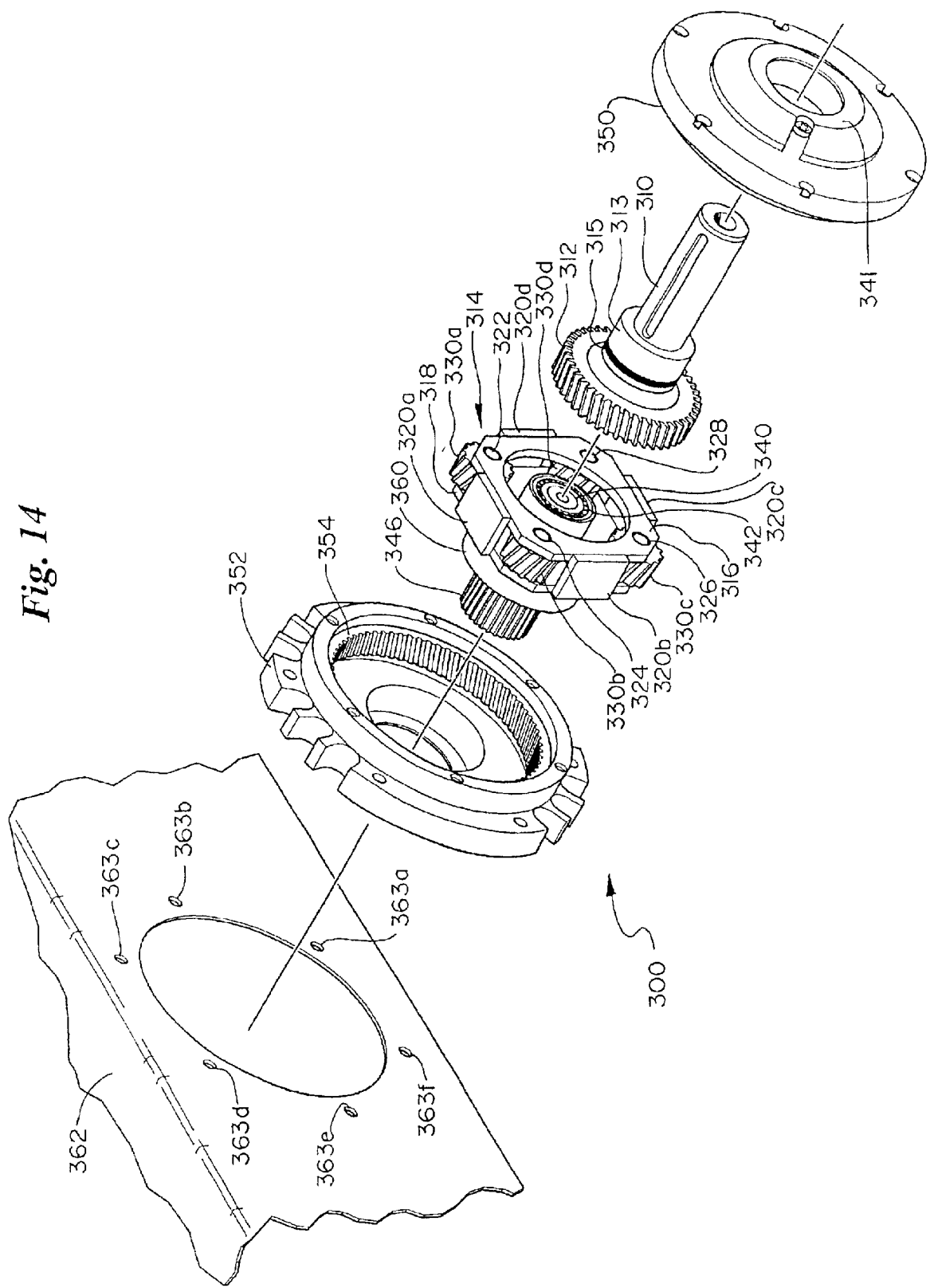
FIG. 14 is an exploded view of a further alternative embodiment of a planetary gear system of the present invention.
Figure 15:
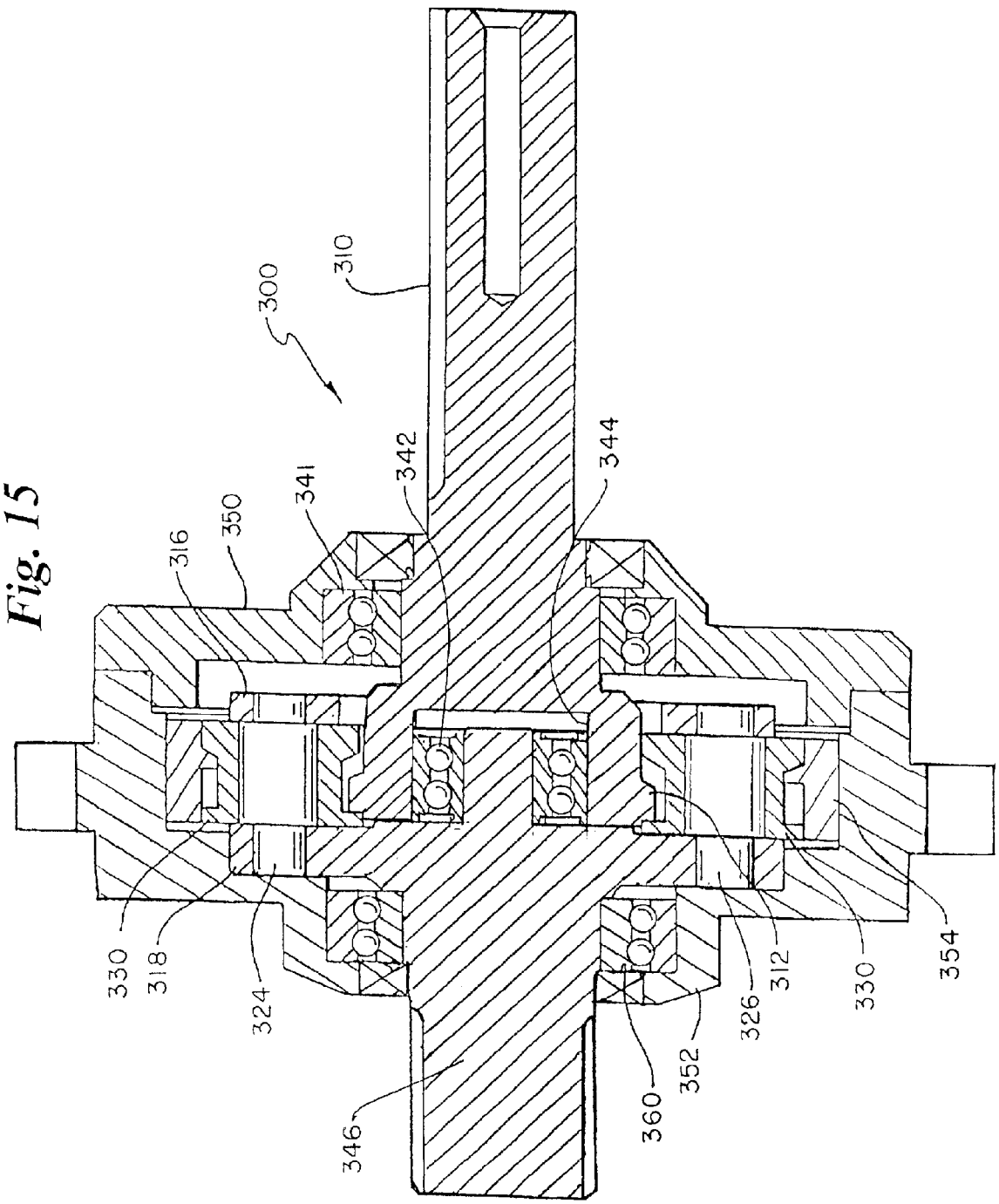
FIG. 15 is a sectional view of the planetary gear system shown in FIGS. 12, 13 and 14.

FIG. 14 is an exploded view of one embodiment of a planetary gear system 300 arranged along a center axis. FIG. 15 is a sectional view of the planetary gear system 300.

It is important to note that a planetary gear system according to the present invention may be any gear reduction system that utilizes a plurality of planetary gears, a sun gear and a ring gear to realize an rpm reduction. A planetary gear system may utilize a stationary ring gear resulting in rotation of the cage holding the planetary gears. Alternatively, it is also within the scope of the present invention that the planetary gear system utilize a stationary cage resulting in a rotating ring gear.

A planetary gear system of the present invention including the embodiment shown in FIG. 14 may be utilized either on the same longitudinal axis of the engine drive shaft or the longitudinal axis of the secondary clutch. Each of these locations of a planetary gear system is disclosed above. The embodiment of a planetary gear system 300 shown in FIGS. 12–15 may also be utilized in either of these locations. For sake of brevity, the placement of the planetary gear system 300 is only shown and described in the position on the longitudinal axis of the track shaft. However, the invention certainly contemplates the positioning of the planetary gear system 300 on the longitudinal axis of the engine drive shaft as would be well understood by one of skill in the art when considered with the disclosure set forth above and throughout this specification.

Turning first to the planetary gear system 300 shown in FIGS. 14 and 15, the input shaft 310 (also referred to as a drive shaft or first shaft) is coupled to and is driven by the secondary clutch 308 shown in FIG. 10. An input shaft is any shaft capable of transmitting rotational energy along its length. An input shaft can come in many different configurations. One embodiment of an input shaft is input shaft 310. The input shaft 310 is integrally part of the sun gear 312. However, the input shaft of this invention is not required to be integral with the sun gear. The input shaft 310 includes a larger diameter section 313 that sealingly fits within a roller bearing 341 in the first housing member 350. The seal between the input shaft 310 and the first housing member is provided by a grease seal 315. The input shaft 310 is rotatably supported in suitable bearings such as roller bearings 341 and 342.

A planetary gear system may include a planetary cage assembly. A planetary cage assembly is a plurality of planetary gears and a cage or other member that supports the plurality of planetary gears. One embodiment of a planetary cage assembly is planetary cage assembly 314. Planetary cage assembly 314 includes a cage including a pair of planetary gear plates 316 and 318 held together by spacer's 320a–d. The plates 316 and 318 carry a plurality of shafts 322, 324 326 and 328 that rotatably support the planetary gears 330a–d, respectively. The shafts 322, 324, 326 and 328 may be integrally secured to the plates 316 and 318, which in turn serve to maintain the planetary gears 330a–d in spaced relationship around the sun gear 312. Spacer's 320a–d may retain plates 316 and 318 in proper spaced relationship.

The planetary cage assembly 314 includes a weight bearing protrusion 340 and a double roller bearing 342 positioned around the weight-bearing protrusion 340. A weight bearing protrusion is a protrusion or other profile that is capable of structurally supporting the weight of the sun gear. The weight bearing protrusion 340, along with the double roller bearing 342, are sized to fit within an opening 344 (see FIG. 15) in the end of the integral member comprising the input shaft 310 and sun gear 312. The weight-bearing protrusion 340 therefore supports the weight of the sun gear 312 and input shaft 310.

A second shaft of a planetary gear system is any member coupled to one of the ring gear and planetary cage assembly wherein such member is capable of acquiring at least a portion of the rotational energy of the one of the ring gear and planetary cage assembly that rotates. A second shaft may be integral with or connected to the planetary cage assembly or alternatively integral with or connected to the ring gear. One embodiment of a second shaft of a planetary gear system is second shaft 346. Second shaft 346 is connected to plates 316 and 318 such that rotation of the plates 316 and 318 results in rotation of the second shaft 346. In the embodiment shown in FIG. 14, the second shaft 346 is a male-type splined member. It is certainly within the scope of this invention to have a second shaft having a female fitting or some other structure for connecting to whatever member the second shaft is driving.

Planetary gear system 300 further includes a housing 349, including first housing member 350 and a second housing member 352. The housing members 350 and 352 may be held together by suitable screws (not shown).

Roller bearing 360 provides bearing support of the planetary cage assembly 314 by the second housing member 352.

A ring gear 354 is mounted in the second housing member 352. The ring gear 354 engages the planetary gears 330a–d. As different size ring gears may be desired, the ring gear 354 may be removed from the second housing member 352 and replaced with a ring gear having a different diameter or different size gear teeth. The sun gear, planetary gears and the ring gear may be cast of high carbon steel.

The sun gear 312, planetary cage assembly 314 and ring gear 354 are contained in housing 349, including first housing member 350 and second housing member 352. The housing 349 is sealed and contains lubricating oil. The lubricating oil is anything that reduces the wear on the sun gear 312, planetary gears 330a–d, and ring gear 354. In one embodiment the oil used in the housing 349 is synthetic gear lube or alternatively synthetic transmission fluid.

In preferred embodiments of the planetary gear system of the invention, the gear reduction ratio ranges from about 6:1 to 1:1. This is contrasted with the conventional chain and sprocket reduction ratio range of from 1.6:1 to 2:1. The conventional chain and sprocket ratio range is limited by the diameter of the sprockets and the strength of the smaller drive sprocket.

Figure 13:
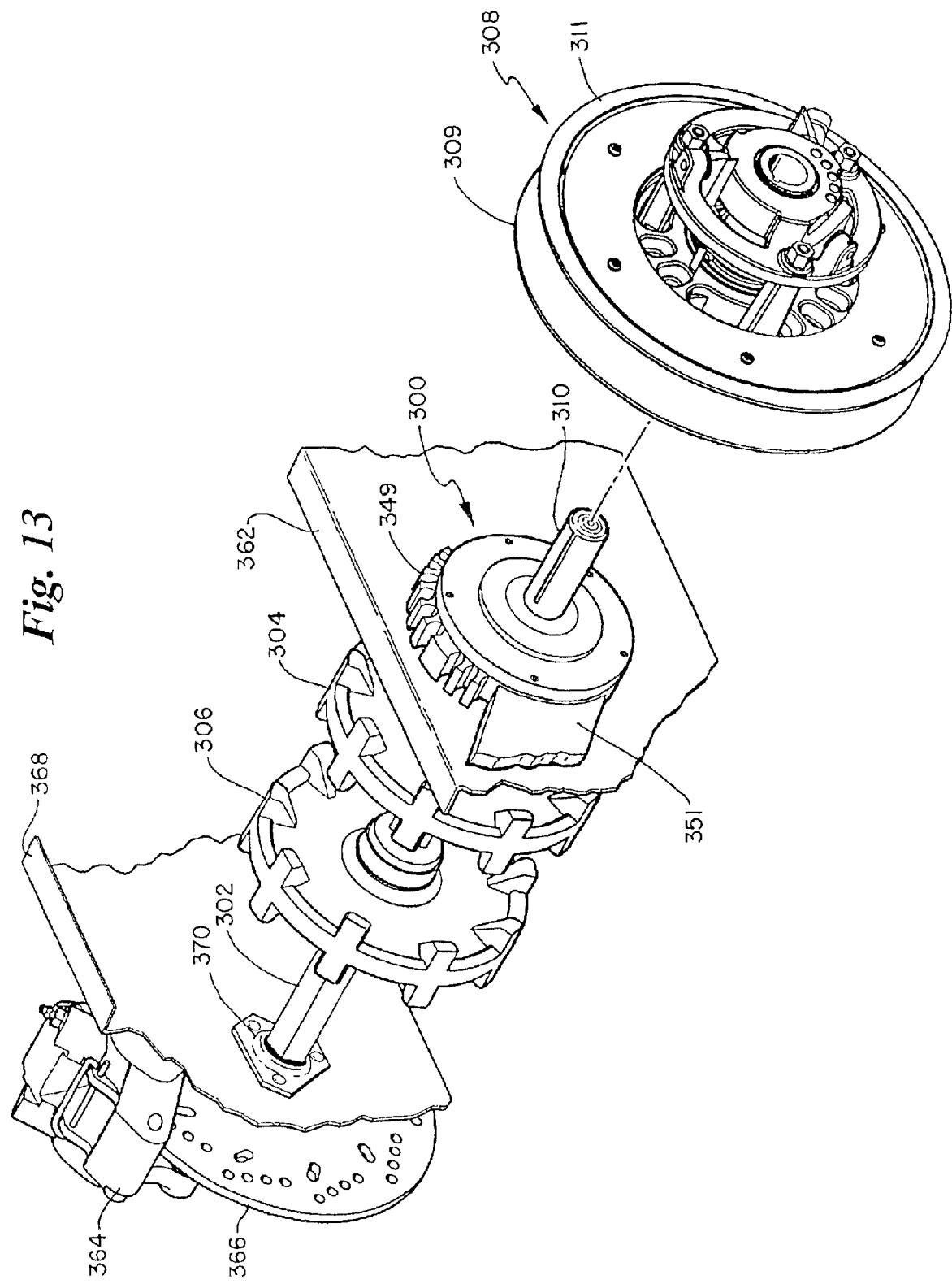
FIG. 13 is a portion of an alternative embodiment of a portion of drive train of the present invention.

Now turning to one embodiment placement of the planetary gear system 300 within the drive train 303, we turn our attention to FIG. 13. FIG. 13 is a perspective view of a portion of the drive train 303 shown in FIG. 14. FIG. 13 includes some additional components not shown in FIG. 14, such as the right chassis 362, left chassis 368, and stiffener 351. In the embodiment shown in FIG. 13, the planetary gear system 300 is mounted coaxial with the track shaft 302. The input 310 is driven, through keyed connection, by the secondary clutch 308 of a continuously variable transmission. The second or output shaft 346 of the planetary gear system 300 is coupled to and drives the track shaft 302. It is certainly within the scope of this invention for the track shaft 302 and second shaft 346 to be an integral or one-piece member.

In the embodiment of the drive train of the present invention shown in FIG. 13, the planetary gear system 300 is positioned adjacent to the outside of left chassis 362. It may be desirable to attach the housing 349 to the left chassis 362 with bolts (not shown) through holes in the left chassis 362 such as holes 363a–e. The planetary gear system 300 is supported by a stiffener or bracket 351 that has one end attached to the housing 349 of the planetary gear system 300 as shown, and the opposite end (not shown) secured to an engine mount (not shown).

The present invention may also include a reverse unit (not shown) for driving the snowmobile in the reverse direction. Such a reverse unit could be used in conjunction with any of the embodiments described. In the embodiment described above as shown in FIGS. 12–15, the reverse unit utilizes a strap for either locking or unlocking the ring gear of the planetary gear system. When the ring gear is locked, the planetary gear system operates as described above and the power from the engine passes through the input shaft to the planetary cage to the output shaft and drives the snowmobile in a forward direction. When the ring gear is unlocked (capable of rotating), the planetary gear system operates to drive the snowmobile in a reverse direction. When the ring gear is unlocked, the power path from the engine is through the input shaft to the to fixed planetary cage then to the unlocked rotating ring gear which becomes the output shaft. In other words, when operating in reverse, the ring gear rotates instead of the planetary cage.

The drive train of the present invention includes a track drive sprocket, alternatively referred to as a drive sprocket or simply as a sprocket. A sprocket is any member attached to a track shaft and engaged with a continuous drive track such that rotation of the track shaft causes rotation of the sprocket that causes rotation of the continuous drive track. The sprockets 304 and 306 are one well-known embodiment of a sprocket.

A conventional brake caliper 364 and disk 366 are mounted on the track shaft 302 to the outside of the right chassis 368. Alternatively, the brake caliper and disk may be located to the inside of the right chassis 368.

A bracket 370 containing a ring bearing (not shown) is secured to the right chassis 368 and further supports the track shaft 302.

A continuously variable transmission is any mechanism or system that provides variable gear reduction. One embodiment of a continuously variable transmission is referred to as a reduced rpm clutch or alternatively a clutch system. One embodiment of a continuously variable transmission or clutch system is a primary clutch (alternatively referred to as a drive clutch), a belt and a secondary clutch (alternatively referred to as a driven clutch), wherein the secondary clutch is driven by and connected to the primary clutch through the belt. This type of continuously variable transmission is well known.

One embodiment of the present invention utilizes a secondary clutch that has a smaller diameter than the prior art secondary clutch. Conventional secondary clutches typically have a diameter of about 10.5 to 11.7 inches. One embodiment of the present invention utilizes a secondary clutch having a diameter between 8 inches and 9.5 inches. The embodiment of the secondary clutch shown in FIGS. 12 and 13, namely secondary clutch 308 has a diameter of 8.6 inches. This diameter is measured from the outer edge of sheaves 309 and 311.

Significant advantages result from the use of a smaller diameter secondary clutch. For example, the smaller diameter secondary clutch results in less overall mass as well as less rotating mass. Furthermore, the smaller secondary clutch is more compact. Furthermore, as is discussed in more detail below, the smaller secondary clutch allows for a wider range of rpm reduction ratios.

The advantage of a more compact secondary clutch such as secondary clutch 308 is now further described. The present invention may result in placement of the secondary clutch on the same axis as the track shaft. A consequence of this placement is that a larger diameter or conventional secondary clutch is likely to strike the ground or snow in certain snowmobile driving circumstances. Therefore, a smaller diameter secondary clutch has the advantage of being able to place such clutch on the axis of the track shaft and yet maintain proper ground clearance. The only alternative to the smaller diameter secondary clutch would be to raise the track shaft. However, a lower track shaft translates into a desirable lower center of gravity for the snowmobile. It may also be desirable to configure the continuous track in a particular path that requires the track shaft and sprockets to be positioned in a lower position.

As mentioned above, a further advantage of the smaller diameter secondary clutch is the resulting wider range of rpm reduction ratios. The 8.6 inch diameter secondary clutch with a standard 8 inch diameter primary clutch yields a start-up ratio (when the snowmobile is going from being stationary to moving) of 2.77:1. The full ratio (when the snowmobile is moving) is 2.04:1. This yields an overall ratio of the continuously variable transmission of 5.65:1. A conventional continuously variable transmission with the larger 10.5 inch diameter secondary clutch and an 8 inch diameter primary clutch yields a start-up ratio of 3.44:1 and a full ratio of between 1:1 and 1.21:1. Therefore, at best, the conventional overall ratio of the continuously variable transmission is 4.16:1. This ratio change from 4.16:1 to 5.65:1 is a 36% increase in ratio range. The 36% increase in ratio range results in a better ability for the snowmobile to take-off from starting position to a moving position with reduced jerkiness that is caused by the initial engagement of the transmission.

The operation of the embodiment drive train partially shown in FIGS. 12–15, including the continuously variable transmission is here provided. The engine 301 may be a conventional gasoline powered engine of the type generally found in snowmobiles. However, the engine may be any other type of engine suitable for driving a snowmobile. The engine drive shaft (not shown in FIG. 12, but for example a shaft such as shaft 15 in FIGS. 2 and 3) rotatably drives the primary clutch 305 that in turn drives the belt 307. The drive belt drives the secondary clutch 308 that rotatably drives the input shaft 310. The sun gear 312 is then driven by the input shaft 310. The sun gear 312 engages the planetary gears 330a–d, which are rotatably supported, in the plates 316, 318. The force of the sun gear 312 acting on the planetary gears 330a–d cause the gears 330a–d to rotate and move along the ring gear 354 thereby rotating the plates 316, 318. The rotation of plates 316, 318 rotatably drives the second shaft 346. The second shaft 346 rotates at an rpm lower than the rotation of the input shaft 310 resulting in a gear reduction. The second shaft 346 in turn drives sprockets 304 and 306 that in turn engage and drive the endless track (such as endless or continuous track 14 of FIG. 1).

The above specification, examples and data provide a complete description of the device and use of the invention. Since many embodiments of the invention can be made without departing from the spirit and scope of the invention, the invention resides in the claims hereinafter appended.

What is claimed is:

1. A snowmobile comprising:
a frame having a forward portion and a rear portion, said frame including pair of skis supporting said forward portion and an endless drive track supporting said rear portion, an engine supported in said frame, a clutch system including a primary clutch and a secondary clutch having a secondary clutch axis, a drive train connected to said engine and said endless drive track, said drive train including a planetary gear system, said planetary gear system including a first shaft and a sun gear driven by said first shaft, said first shaft being driven by said engine, planetary gears drivenly engaged with said sun gear, said planetary gears continuously rotating about said sun gear when said sun gear is driven by said first shaft, and a second shaft including a second shaft axis and a planetary gear plate engaged with said planetary gears, said second shaft being driven by said planetary gears, said second shaft driving said endless drive track, said secondary clutch axis being coaxial with said second shaft axis.

2. The snowmobile of claim 1 wherein said planetary gear system is driven by said engine engaging through a clutch system.

3. The snowmobile of claim 2 wherein said planetary gear system comprises four planetary gears and wherein said four planetary gears are equally spaced around said sun gear.

4. The snowmobile of claim 1 wherein said planetary gear system includes a plurality of planetary gears equally spaced around said sun gear.

5. The snowmobile of claim 4 wherein said planetary gear system comprises three planetary gears.

6. The snowmobile of claim 4 wherein said second shaft drives a differential and wherein said differential drives said endless drive track.

7. The snowmobile of claim 6 wherein said first shaft includes a first end adjacent said engine and a second end adjacent said sun gear and wherein said first shaft is supported on a pair of ring bearings, the first of said pair of ring bearings being disposed adjacent said first shaft end and the second of said pair of ring bearings being disposed adjacent said second end of said first shaft.

8. A snowmobile comprising:
a frame having a forward portion and a rear portion, said frame including a pair of skis supporting said forward portion and an endless drive track supporting said rear portion, an engine supported in said frame, a drive shaft extending from and being driven by said engine, a drive train connected to said drive shaft and to said endless drive track, said drive train including a reduction drive comprising a planetary gear system, said planetary drive system including a first shaft and a sun gear coupled to and driven by said first shaft, said first shaft being coupled to the drive shaft, planetary gears drivenly engaged with said sun gear, said planet gears continuously rotating about said sun gear when said sun gear is driven by said first shaft, and a second shaft including a ring gear engaged with said planetary gears, said ring gear having a single axial and rotated position relative to said first shaft, whereby the planetary gears and sun gear rotate relative to the ring gear at all times when the drive shaft rotates, said second shaft driving said endless drive track.

9. The snowmobile of claim 8 wherein said sun gear is mounted at one end of said first shaft and the opposite end of said first shaft being in driven engagement with said engine, said ring gear is disposed at one end of said second shaft, and said planetary gears are disposed between said sun gear and said ring gear, said planetary gear being driven by said sun gear.

10. The snowmobile of claim 9 wherein said planetary gears are equally spaced around said sun gear.

11. The snowmobile of claim 10 wherein said planetary gears are supported in spaced relationship by a ring plate.

12. The snowmobile of claim 11 wherein said ring plate comprise a pair of ring plates, one of said ring plates being disposed on each side of said planetary gears.

13. The snowmobile of claim 12 wherein said ring plate further includes a plurality of planetary shafts, each of planetary shafts rotatably supporting one of said planetary gears.

14. The snowmobile of claim 13 wherein said reduction drive provides a reduction in the ratio of 1:3.

15. The snowmobile of claim 13 wherein said first shaft includes a stub shaft extending beyond said sun gear and wherein said stub shaft is supported in a roller bearing.

16. The snowmobile of claim 15 wherein said second shaft is supported in a roller bearing disposed adjacent said ring gear.

17. A snowmobile including
an engine with a drive shaft;
an endless track;
an endless track shaft positioned within the endless track that drives the endless track;
a planetary gear system interconnecting said engine drive shaft and said endless track shaft, said planetary gear system including a fixed housing, a rotatable sun gear driven by said engine drive shaft, rotatable planetary gears driven by said sun gear, a ring gear engaging said planetary gears and being fixed to said housing so as to be immovable relative to said sun gear and said planetary gears, a first shaft positioned between said engine drive shaft and said sun gear, and a second shaft positioned between said planet gears and said endless track shaft, said first and second shafts being arranged coaxially; and
a continuously variable transmission connecting said engine drive shaft to said endless track shaft wherein said engine drive shaft drives said endless track shaft through the continuously variable transmission.

18. The snowmobile of claim 17 wherein said planetary gears serve to provide driving power from said sun gear to said ring gear.

19. The snowmobile of claim 18 wherein said sun gear is integrally mounted on said engine drive shaft.

20. The snowmobile of claim 19 wherein said planetary gears comprise four planetary gears.

21. The snowmobile of claim 20 wherein said planetary gears comprise three planetary gears.

22. The snowmobile of claim 21 wherein said sun gear and engine drive shaft are rotatably supported in a bearing associated with said ring gear and drive shaft.

23. A snowmobile comprising:
a frame having a forward portion and a rear portion, said frame including a pair of skis supporting said forward portion and an endless drive track supporting said rear portion, an engine supported in said frame and including a drive shaft having a drive shaft axis, a drive train connected to said engine drive shaft and to said endless drive track, said drive train including a primary clutch having a primary clutch axis that is coaxial with said drive shaft axis, a secondary clutch having a secondary clutch axis, and a planetary gear system, said primary clutch and said secondary clutch being interconnected by a belt, said planetary drive system including a first shaft having a first shaft axis and a sun gear secured to and driven by said first shaft, said first shaft being driven by said engine through said primary clutch, said belt, and said secondary clutch, said first shaft axis being coaxial with said secondary clutch axis, said planetary gears being drivenly engaged with said sun gear, said planetary gears continuously rotating about said sun gear when said sun gear is driven by said first shaft, and said second shaft being engaged with said planetary gears, said second shaft being driven by said planetary gears, said second shaft driving said endless drive track.

24. The snowmobile of claim 23 wherein said planetary gear system comprises four planetary gears and wherein said four planetary gears are equally spaced around said sun gear.

25. The snowmobile of claim 23 wherein said planetary gear system includes a plurality of planetary gears equally spaced around said sun gear.

26. The snowmobile of claim 25 wherein said planetary gear system comprises three planetary gears.

27. The snowmobile of claim 23 wherein said first shaft includes a first end adjacent said engine and a second end adjacent said sun gear and wherein said first shaft is supported on a pair of ring bearings, the first of said pair of ring bearings being disposed adjacent said first shaft end and the second of said pair of ring bearings being disposed adjacent said second end of said first shaft.

28. A snowmobile comprising:
a frame having a forward portion and a rear portion, said frame including a pair of skis supporting said forward portion and an endless drive track supporting said rear portion, an engine supported in said frame, a drive train connected to said engine and to said endless drive track, said drive train including a clutch system, said clutch system including a reduction drive comprising a planetary gear system, said planetary drive system including a fixed housing, a first shaft, and a sun gear driven by said first shaft, said first shaft being directly driven by said engine, said planetary gears drivenly engaged with said sun gear, a second shaft, and a ring gear engaged with said planetary gears, said ring gear being fixed to the housing and being immovable relative to said sun gear and said planetary gears; a primary clutch driven by said second shaft, a secondary clutch and a belt providing driving engagement between said primary clutch and said secondary clutch, said secondary clutch serving to drive said endless track.

29. A snowmobile comprising:
a frame having a forward portion and a rear portion, said frame including a pair of skis supporting said forward portion and an endless drive track supporting said rear portion, an engine supported in said frame, a drive train connected to said engine and to said endless drive track, said drive train including a planetary gear system, primary clutch and a secondary clutch, said primary clutch and said secondary clutch being interconnected by a belt, said planetary drive system including a first shaft and a sun gear driven by said first shaft, said first shaft being driven by said engine, said planetary gears being drivenly engaged with said sun gear, said planetary gears continuously rotating about said sun gear when said sun gear is driven by said first shaft, and a second shaft engaged with said planetary gears, said second shaft being driven by said planetary gears, wherein said second shaft drives said primary clutch and said second shaft drives said endless drive track through said primary clutch and said secondary clutch.

30. The snowmobile of claim 29 wherein said first shaft includes a first end adjacent said engine and a second end adjacent said sun gear and wherein said first shaft is supported on a pair of ring bearings, the first of said pair of ring bearings being disposed adjacent said first shaft end and the second of said pair of ring bearings being disposed adjacent said second end of said first shaft.

31. A snowmobile comprising:
(a) a frame having a forward portion and a rear portion, said frame including a ski supporting said forward portion, and said frame including an endless drive track;
(b) an engine supported in said frame;
(c) a drive train connected to said engine and to said drive track, wherein said drive train comprises:
 (i) an engine drive shaft extending from and capable of being rotated by the engine, the engine drive shaft having a first longitudinal axis;
 (ii) a track shaft positioned within the endless drive track and having a second longitudinal axis;
 (iii) a sprocket coupled to the track shaft wherein rotation of the track shaft causes rotation of the sprocket, and wherein the sprocket drives the endless drive track;
 (iv) a continuously variable transmission connecting the engine drive shaft to the track shaft wherein the engine drive shaft drives the track shaft through the continuously variable transmission; and
 (v) a planetary gear system having an input shaft and a second shaft, wherein the engine drive shaft drives the input shaft and the second shaft drives the track shaft, wherein the input shaft and the second shaft are coaxial with the second longitudinal axis, wherein there exists a gear reduction from the input shaft to the second shaft.

32. The snowmobile according to claim 31, wherein the input shaft is connected to and driven by the continuously variable transmission, and wherein the second shaft is connected to and drives the track shaft.

33. The snowmobile according to claim 32, wherein the second shaft and the track shaft are a single integral shaft.

34. The snowmobile according to claim 31, wherein the gear reduction ratio caused by the planetary gear system is between 1:1 and 6:1.

35. A snowmobile comprising:
(a) a frame having a forward portion and a rear portion, said frame including a ski supporting said forward portion, and said frame including an endless drive track;
(b) an engine supported in said frame; and (c) a drive train connected to said engine and to said endless drive track, wherein said drive train comprises:
  (i) a planetary gear system including a input shaft and a second shaft coaxial with the input shaft, wherein the input shaft is driven by the engine and the second shaft is driven by the input shaft with a gear reduction from the input shaft to the second shaft; and
  (ii) a sprocket that rotates about an axis of a endless track drive shaft positioned within the endless track, wherein the sprocket is coaxially connected to and driven by the second shaft, and wherein the sprocket drives the endless drive track.

36. The snowmobile according to claim 35, wherein the planetary gear system further comprises:
  (a) a sun gear connected to the input shaft, wherein the sun gear defines an opening;
  (b) a ring gear wherein the ring gear is rotationally stationary; and
  (c) a planetary cage assembly engaged with the sun gear and the ring gear, wherein the planetary cage assembly comprises:
    (i) a weight bearing protrusion connected to the second shaft wherein the weight bearing protrusion is received by the opening in the sun gear, wherein the weight bearing protrusion supports the sun gear;
    (ii) a cage connected to the second shaft wherein rotation of the cage results in rotation of the second shaft; and
    (iii) a plurality of planetary gears supported by the cage, wherein the planetary gears gearingly mesh with the sun gear and the ring gear, wherein rotation of the sun gear causes rotation of the planetary gears, and wherein rotation of the planetary gears within the ring gear cause the planetary cage assembly including the second shaft to rotate.

37. The snowmobile according to claim 35, wherein the drive train further comprises a continuously variable transmission, wherein the continuously variable transmission is driven by the engine and wherein the continuously variable transmission drives the planetary gear system.

38. The snowmobile according to claim 37, wherein the continuously variable transmission comprises a primary clutch, a belt, and a secondary clutch, wherein the primary clutch is driven by the engine, wherein the secondary clutch is connected to the primary clutch by the belt, wherein the secondary clutch is driven by the primary clutch, and wherein the secondary clutch is coupled to and drives the planetary gear system.

39. A snowmobile comprising:
  (a) a frame having a forward portion and a rear portion, said frame including a pair of skis supporting said forward portion, and said frame including an endless drive track;
  (b) an engine supported in said frame; and
  (c) a drive train connected to said engine and to said endless drive track, said drive train consisting essentially of:
    (i) an engine drive shaft extending from the engine and capable of being rotated by the engine, the engine drive shaft having a first longitudinal axis;
    (ii) a track shaft having a second longitudinal axis;
    (iii) a sprocket coupled to the track shaft wherein rotation of the track shaft causes rotation of the sprocket, and wherein the sprocket drives the endless drive track;
    (iv) a continuously variable transmission including a primary clutch that rotates about a primary clutch axis and a secondary clutch that rotates about a secondary clutch axis, wherein the engine drive shaft drives the primary clutch, the primary clutch drives the secondary clutch, and the secondary clutch drives the track shaft, the first longitudinal axis being coaxial with the primary clutch axis and the second longitudinal axis being coaxial with the secondary clutch axis; and
    (v) a planetary gear system having an input shaft and a second shaft, wherein the engine drive shaft drives the input shaft and the second shaft drives the track shaft, wherein the input shaft and the second shaft are coaxial with one of the axes selected from the group consisting of the first longitudinal axis and the second longitudinal axis, wherein there exists a gear reduction from the input shaft to the second shaft.

* * * * *